United States Patent [19]
Petrak

[11] Patent Number: 5,687,972
[45] Date of Patent: Nov. 18, 1997

[54] UNITARY OIL SEAL ASSEMBLY

[76] Inventor: Gregory H. Petrak, 16488 W. 55th Dr., Golden, Colo. 80403

[21] Appl. No.: 757,745

[22] Filed: Nov. 26, 1996

[51] Int. Cl.⁶ .................................................. F16J 15/36
[52] U.S. Cl. .................. 277/38; 277/42; 277/51; 277/65; 277/95; 277/153
[58] Field of Search .................. 277/31, 37, 38, 277/39, 42, 43, 51, 52, 58, 65, 88, 90, 95, 152, 153, 166; 384/139, 140, 481

[56] References Cited

U.S. PATENT DOCUMENTS

| | | | |
|---|---|---|---|
| Re. 30,223 | 3/1980 | Prescott et al. | 277/37 |
| 2,881,015 | 4/1959 | Wahl | 277/90 |
| 3,311,430 | 3/1967 | Christensen et al. | 277/42 |
| 4,427,202 | 1/1984 | Backlin | 277/95 |
| 4,861,172 | 8/1989 | Annast et al. | 277/51 |
| 4,863,292 | 9/1989 | Dreschmann et al. | 384/482 |
| 4,928,979 | 5/1990 | Nagasawa | 277/38 |
| 4,962,936 | 10/1990 | Matsushima | 277/37 |
| 4,968,044 | 11/1990 | Petrak | 277/95 |
| 5,015,001 | 5/1991 | Jay | 277/38 |
| 5,098,112 | 3/1992 | Petrak | 277/39 |
| 5,147,139 | 9/1992 | Lederman | 277/95 |
| 5,186,472 | 2/1993 | Romero et al. | 277/38 |
| 5,269,536 | 12/1993 | Matsushima et al. | 277/38 |
| 5,348,312 | 9/1994 | Johnston | 277/39 |
| 5,421,592 | 6/1995 | Petrak | 277/38 |
| 5,522,600 | 6/1996 | Duckwall | 277/38 |

*Primary Examiner*—William A. Cuchlinski, Jr.
*Assistant Examiner*—John L. Beres
*Attorney, Agent, or Firm*—John E. Reilly

[57] ABSTRACT

A unitary oil seal assembly intended for installation between relatively rotating inner and outer concentric members, such as, a shaft and housing of a motor vehicle is made up of a combination of a radial seal engageable with the shaft and a facial axial seal engageable with a rotating counterface and forming a part of a seal body which is mounted within the bore of a housing, a fixed axial relationship being maintained between the radial seal, facial seal and their respective sealing surfaces notwithstanding relative axial movement or misalignment between the shaft and housing.

13 Claims, 2 Drawing Sheets

UNITARY OIL SEAL ASSEMBLY

BACKGROUND AND FIELD OF INVENTION

This invention relates to seals, and more particularly to a novel and improved unitary oil seal assembly which is specifically adaptable for use as a wheel oil seal between relatively rotating members, such as, the shaft and bore of a planetary wheel.

In oil sealing applications it is necessary to seal in oil and prevent ingress of contamination from the external environment. In many rotary applications, sealing oil while excluding contamination can be particularly difficult where substantial amounts of contamination are present or where there is substantial relative motion between a rotating shaft and outer housing as, for instance, in a planetary wheel of a vehicle. In many applications, the shaft is free to slide somewhat axially relative to the bore or housing and this type of relative motion creates sealing difficulties. When the shaft slides outwardly away from a fixed radial seal lip, the shaft will tend to collect contamination in the form of dust and other abrasive particles. When the shaft slides back toward the radial seal lip, this contamination can become trapped between the radial lip and shaft and can become embedded in the radial seal lip itself. As the shaft continues to rotate, this entrapped contamination scores the shaft to such an extent that the oil bypasses the radial seal lip and can leak to the outside. In such rotary applications, it is important to protect the radial oil seal lip with an excluder seal, preferably of the axial facial type. The excluder seal enhances sealing by preventing abrasive contaminants from coming into contact with the radial oil seal. In certain cases, however, the amount of axial movement of the shaft relative to the bore is so great that the excluder seal is not capable of maintaining contact with its counterface through the full extension of the shaft. It is therefore an important feature of the present invention to unitize the radial seal with the facial excluder seal in such a way that both seals move axially with the shaft as it slides in and out of the bore, and both seals maintain contact with their respective mating surfaces, even though the shaft may undergo substantial axial movement relative to the bore.

In my prior U.S. Pat. No. 5,098,112 for Unitized Dynamic Facial Seal, there is disclosed a dynamic seal assembly made up of an annular seal body with a sealing lip and a flexible wall section extending away from the seal body and terminating in a sealing portion in sealed engagement with an outer stationary housing, and a bearing member positions the seal body and specifically the sealing lip in sealed engagement with a radial flange so that the sealing lip and radial flange can undergo relative rotation while remaining in fixed axial and radial relation to one another notwithstanding relative axial movement between the members. That particular seal assembly is primarily intended for use as a grease seal and is not as much concerned with proper mounting and disposition of an axial facial seal to prevent contaminants from contacting the radial oil sealing lip. Accordingly, there is a need for a seal assembly which will unitize the radial sealing lip with a facial excluder seal in such a way that both move axially with the shaft while maintaining contact with their respective mating surfaces as previously described. Other representative patents in this field are U.S. Pat. Nos. 4,863,292 to P. Dreschmann, 4,928,979 to S. Nagasawa, 4,962,936 to N. Matsushima, 4,968,044 to G. Petrak and 5,421,592 to G. Petrak. Applicant's copending application Ser. No. 08/372,774, filed Jan. 13, 1995, is another representative in this field.

SUMMARY OF THE INVENTION

It is therefore an object of the present invention to provide for a novel and improved oil seal assembly interposed between relatively movable members and of the type having an axial seal to prevent exposure of a radial seal to contaminants which tend to collect along one of the movable members.

It is another object of the present invention to provide in an oil seal assembly interposed between relatively rotating inner and outer concentric members for a combination of a radial seal and a facial excluder seal in fixed axial relationship to one another notwithstanding relative axial movement or misalignment between the members to be sealed.

It is a further object of the present invention to provide a unitary oil seal assembly installed between a rotating shaft and stationary housing which is capable of maintaining a fixed axial relationship between a radial seal and axial facial seal and between the seals and the shaft notwithstanding axial movement between the shaft and housing members and in such a way as to prevent contaminants from penetrating the seal assembly.

It is an additional object of the present invention to provide for a unitary oil seal assembly in the form of a cassette combining an oil seal, labyrinth and axial facial seal wherein the oil seal and axial facial seal are maintained in fixed axial relationship to one another notwithstanding large amounts of shift, end play and misalignment of relatively rotating members between which the cassette is mounted.

In accordance with the present invention, in a unitary oil seal assembly interposed between radially inner and outer relatively rotating members wherein the members are movable axially with respect to one another and includes an annular seal body having a radial seal inclining away from one side of the body together with a flexible wall section extending radially from the seal body and terminating in a circumferential sealing portion at one end of the wall section in radially spaced relation to the body, the improvement comprising a counterface having a first radial flange portion engaged by a facial excluder seal, a retainer portion including a second radial flange in fixed axially spaced relation to the first radial flange and wherein the seal body is interposed between the first and second radial flanges, an annular bearing member interposed between the seal body and one of the first and second radial flanges, and the facial excluder seal being in sealed engagement with the other member in fixed, axially spaced relation to the radial seal.

In a preferred embodiment, a rigid band is united with the circumferential sealing portion and mounted in pressfit engagement with an outer fixed housing, and the first radial flange is integrated into a slinger having an inner band in pressfit engagement to a rotating shaft and has an outer band radially spaced between the seal body and circumferential sealing portion to serve as a shield to protect the facial seal against entry of foreign matter; in other words, the outer band effectively forms a labyrinth between the seal body and outer circumferential sealing portion to discourage entry of foreign particles. Furthermore, the retainer portion preferably is rigidly attached to the inner band of the slinger. The fixed axial relationship between the radial seal and axial facial seal and their respective sealing surfaces results primarily from the cooperative disposition and relationship between the retainer portion counterface.

The above and other objects of the present invention will become more readily appreciated and understood from a consideration of the following detailed description of preferred and modified forms of the present invention when taken together with the accompanying drawings in which:

DETAILED DESCRIPTION OF PREFERRED EMBODIMENT

Figure 2:
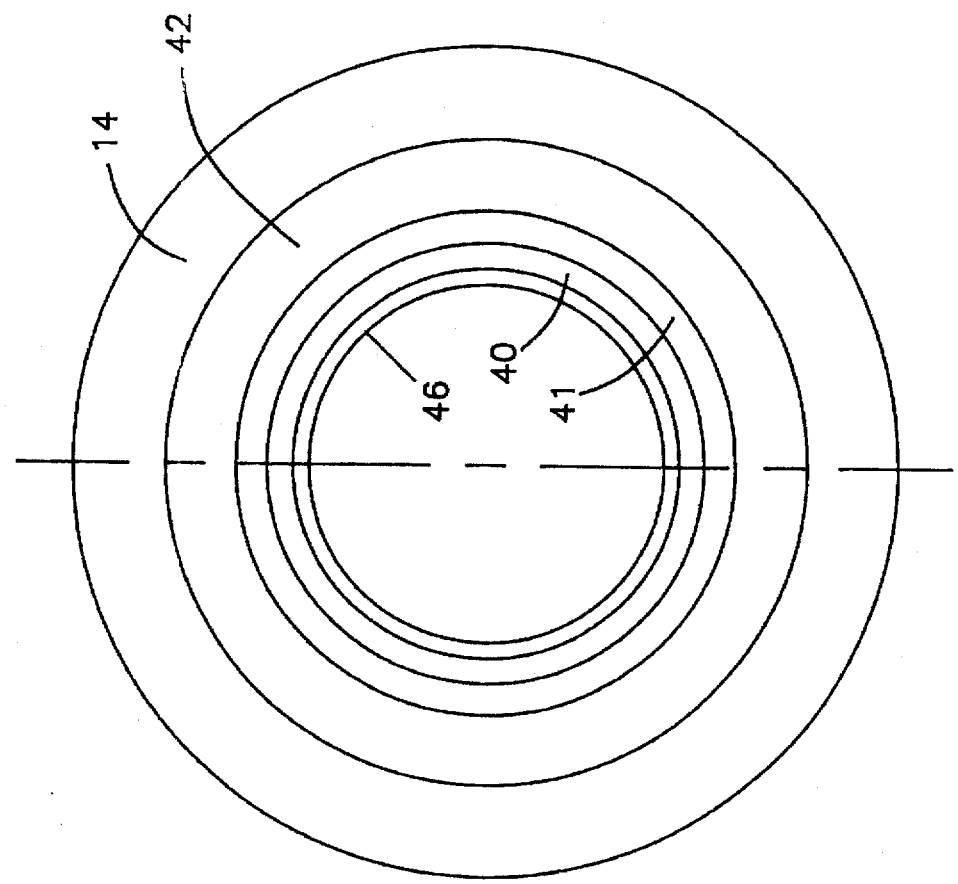
FIG. 2 is an end view of the preferred form shown in FIG. 1.
Figure 1:
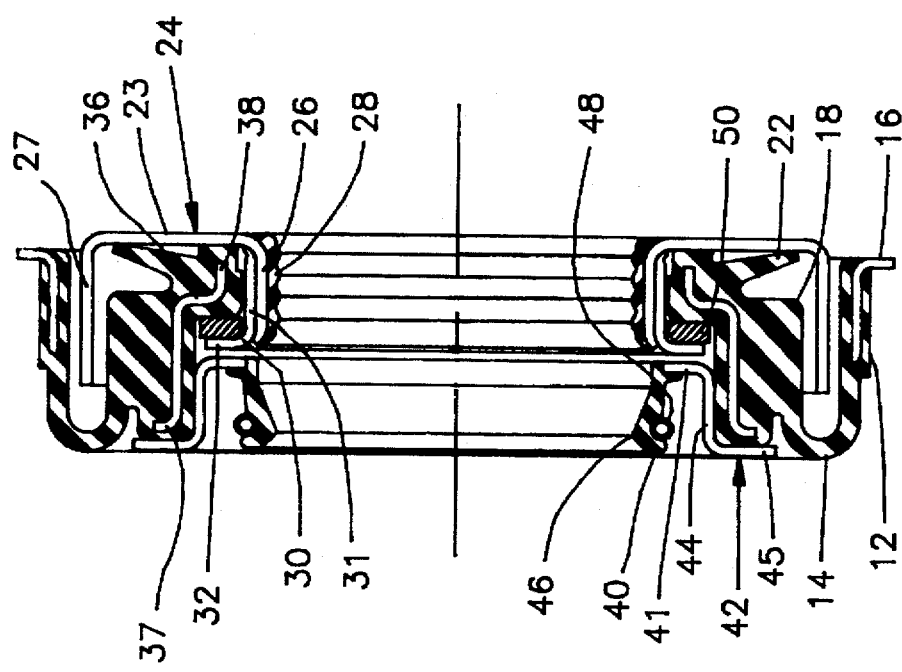
FIG. 1 is a cross-sectional view of a preferred form of oil seal assembly in accordance with the present invention.
Figure 4:
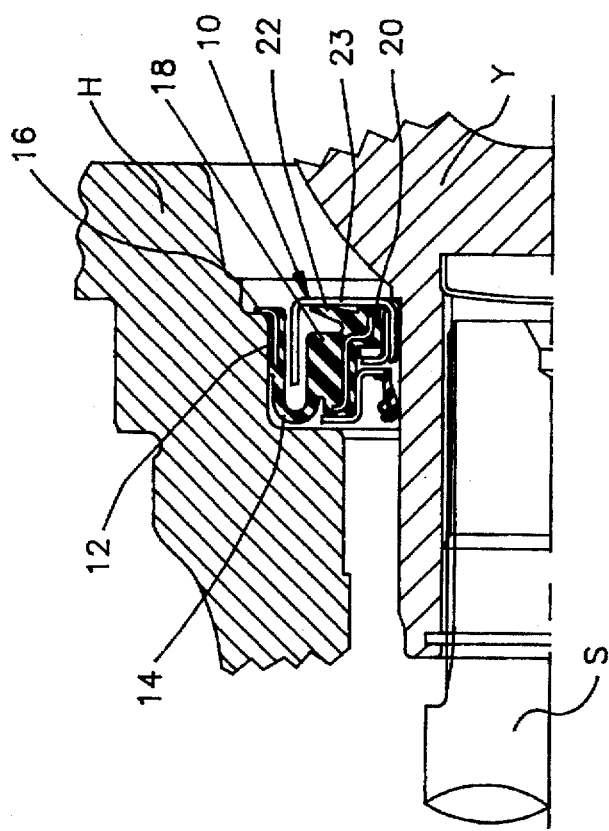
FIGS. 3 and 4 are somewhat schematic views of the preferred form of oil seal assembly mounted between the housing and shaft of a planetary wheel and illustrating opposite extreme axial positions of the oil seal assembly when in operation.
Figure 3:
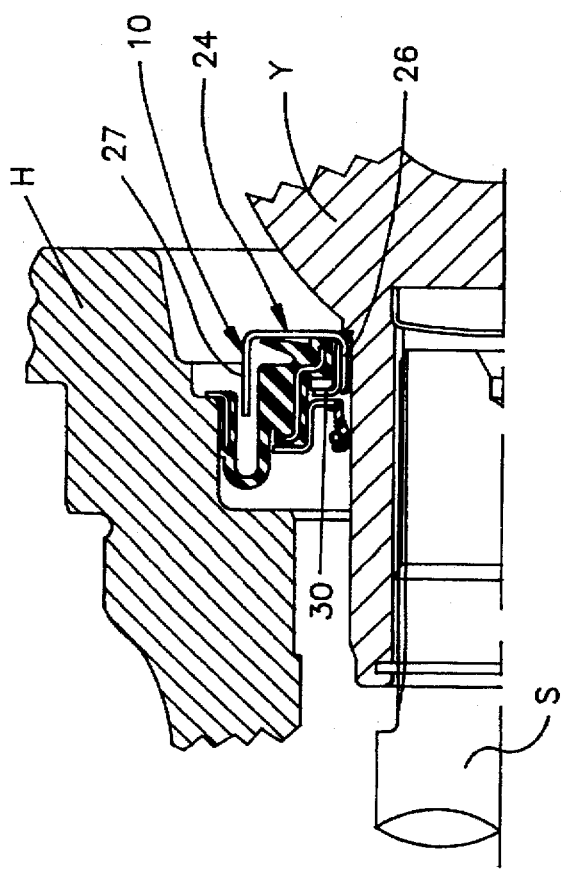

Referring to the drawings, a preferred form of unitary oil seal assembly 10 is shown in FIGS. 1 to 4 installed between relatively rotating members. One representative form of mounting or installation is illustrated in FIGS. 3 and 4 in which the outside diameter of the oil seal assembly is inserted into the bore of a housing H of a planetary wheel, and the inside diameter mounted on a yoke Y of drive shaft S. A circumferential sealing portion 12 defines a radially outer seating portion including a ring member 16 molded into the seating portion 12 for pressfit, tight sealing engagement with the inner wall of the housing H; and a flexible concavo-convex wall section 14 curves in an outboard direction and radially inwardly from the seating portion 12 to terminate in a main seal body 18.

The seal body 18 has a radially inwardly offset extension 20 in an inboard direction and at one end of the seal body 18 which is provided with a radially outwardly inclining facial excluder seal lip 22, the latter sealing against a radial flange 23 of a rotating counterface or slinger 24.

Preferably, the slinger 24 is generally channel-shaped with inner and outer concentric axial bands 26 and 27, respectively, both facing in an outboard direction on opposite radial inner and outer sides of the radial flange 23, the inner band having its radially inside surface provided with a rubber molding strip 28 which along with the band 26 is disposed in pressfit engagement with the yoke Y. A generally L-shaped band 30 has an axial portion 31 facing in an inboard direction, or "oil side", and pressed into surrounding relation to the axial band 26 and a radial portion 32 which cooperates with the slinger 24 to loosely capture the extension 20 of the seal body 18 therebetween. The outer axial band 27 intrudes intermediately between the seal body 18 and the seating portion 12 to effectively form a labyrinth and discourage the entry of foreign matter or particles around the band into direct contact with the excluder seal 22.

The seal body 18 is rigidified by a reinforcing band 36 having radially outer and inner offset portions 37 and 38 and in close proximity to the radially inner surfaces of the main body of the seal 18 and the extension 20, respectively.

A radial oil seal 40 is molded or otherwise permanently affixed to a radial flange 41 at one end of a retainer band 42 which is pressed into the main body of the seal 18 with the seal 40 extending axially and radially inwardly into engagement with the shaft S. Preferably, the retainer member 42 is of generally Z-shaped configuration having an axial portion 44 joining the inner radial flange 41 and an outer radial flange 45. In turn, the radial oil seal 40 terminates in a radially directed seal lip 46 which is yieldingly urged into engagement with the shaft S by a garter spring 48 to prevent oil from leaking past the lip 46, and the seal will follow any axial movement of the shaft S.

A bearing member 50 is preferably in the form of a flat rigid annular plate or washer and is sized for insertion between the radially inner offset portion 38 of the reinforcing band 36 and the radial portion 32 of the band 30 to assist in maintaining a fixed axial relationship between the excluder seal lip 22 and the slinger 24. The bearing member 50 also serves as a low-friction interface between the non-rotating seal body 18 and the rotating radial flange 32 of the retainer 30.

In the relationship hereinbefore described, it is important to note that the flexible wall section or rolling diaphragm 14 establishes a flexible connection between the seating portion 12, which is securely fixed to the housing, and the main seal body 18 and its facial excluder seal lip 22. The seal body 18 is stabilized against axial movement relative to the slinger 24 with the assistance of the bearing 50 interposed between the seal body and the rigid band 30. In turn, the radial seal 40 is secured in fixed axial relation to the seal body 18 as well as to the excluder seal lip 22 but the shaft S is free to rotate independently of the radial seal 40 and the seal body 18. Thus, the slinger 24 and band 30 are free to rotate with the shaft and move axially with the shaft while the main seal body 18, though non-rotating, also is free to move axially with the shaft. In this way, the non-rotating excluder seal 22 will always move axially with the shaft S while maintaining positive contact with the rotating surface of the slinger 24; and, as best seen from FIGS. 3 and 4, notwithstanding axial movement or end play between the shaft S and housing H, both seals 22 and 40 will maintain the same axial relationship to their respective contacting surfaces. The flexible diaphragm-like wall section 14 will, of course, flex or roll to accommodate axial shaft movement while maintaining a positive seal between the main seal body 18 and inside diameter of the housing H.

It is therefore to be understood that while a preferred embodiment of the invention has been herein set forth and described various modifications and changes may be made in the construction and arrangement of parts without departing from the spirit and scope of the present invention as defined by the appended claims and reasonable equivalents thereof.

I claim:

1. In a unitary oil seal assembly interposed between radially inner and outer relatively rotating members wherein said members are movable axially with respect to one another and said assembly includes an annular seal body having a facial excluder seal inclining away from one side of said body together with a flexible wall section extending radially from said seal body and terminating in a circumferential sealing portion at one end of said wall section in radially spaced relation to said body, the improvement comprising:

a counterface having a first radial flange portion engaged by said facial excluder seal;

a retainer portion, said retainer portion including means positioning said excluder seal in sealed engagement with said first radial flange portion whereby said excluder seal and said first radial flange portion are maintained against axial movement relative to one another notwithstanding relative axial shifting between said inner and outer relatively rotating members; and an annular bearing member interposed between said seal body and said positioning means, and a radial seal disposed in sealed engagement with one of said relatively rotating members in fixed, axially spaced relation to said excluder seal.

2. In a unitary oil seal assembly according to claim 1 wherein said retainer portion includes a second radial flange in fixed axially spaced relation to said first radial flange portion and wherein said seal body is interposed between said first and second radial flanges.

3. In a unitary oil seal assembly according to claim 1, wherein a rigid band is united with said circumferential sealing portion and mounted in pressfit engagement with said outer relatively rotating member, and wherein said counterface includes an inner band disposed in pressfit engagement to said inner relatively rotating member.

4. In a unitary oil seal assembly according to claim 3, wherein said counterface is in the form of a slinger including an outer band joined to said inner band by said first radial flange portion, said outer band being radially spaced between said seal body and said circumferential sealing portion.

5. In a unitary oil seal assembly according to claim 4, wherein said retainer portion is rigidly attached to said inner band.

6. In a unitary oil seal assembly according to claim 1, wherein said seal body includes axially offset, radially inner and outer portions, and a rigid reinforcing band embedded in said seal body.

7. In a unitary oil seal assembly according to claim 6, wherein said rigid reinforcing band includes axially offset portions substantially coextensive with said axially offset radial inner and outer portions of said seal body.

8. In a unitary oil seal assembly according to claim 1, wherein said counterface has radially spaced inner and outer axially extending reinforcing bands.

9. In a unitary oil seal assembly interposed between radially inner and outer relatively rotating members wherein said members are movable axially with respect to one another and said assembly includes an annular seal body having a lip seal inclining away from one side of said body together with a flexible wall section extending radially from said seal body and terminating in a circumferential sealing portion at one end of said wall section in radially spaced relation to said body, the improvement comprising:

a rigid band united with said circumferential sealing portion and mounted in pressfit engagement with one of said members;

a slinger having a first radial flange joining radially spaced inner and outer axial bands, said inner band disposed in pressfit engagement with the other of said members and said outer band being radially spaced between said seal body and said circumferential sealing portion;

a retainer portion rigidly attached to said inner band and including a second radial flange in axially spaced relation to said first radial flange and wherein said seal body is interposed between said first and second radial flanges;

an annular bearing member interposed between said seal body and one of said first and second radial flanges; and a radial seal in sealed engagement with the other of said members in fixed, axially spaced relation to said lip seal.

10. In a unitary oil seal assembly according to claim 9, said seal body including axially offset radial inner and outer portions, and a rigid reinforcing band embedded in said seal body.

11. In a unitary oil seal assembly according to claim 9, wherein said flexible wall section is a relatively thin-walled member of generally concavo-convex configuration.

12. In a unitary oil seal assembly according to claim 9, wherein said radial seal includes a compression spring yieldingly urging said radial seal in a radially inward direction against the other of said members.

13. In a unitary oil seal assembly according to claim 9, wherein said retainer portion includes a rubberized surface portion in sealed engagement with the other of said members.

* * * * *